United States Patent
Nabers

(10) Patent No.: US 12,123,444 B2
(45) Date of Patent: Oct. 22, 2024

(54) REMOVABLE BLIND FASTENER

(71) Applicant: Michael Eaton Nabers, San Antonio, TX (US)

(72) Inventor: Michael Eaton Nabers, San Antonio, TX (US)

(*) Notice: Subject to any disclaimer, the term of this patent is extended or adjusted under 35 U.S.C. 154(b) by 0 days.

(21) Appl. No.: 18/374,173

(22) Filed: Sep. 28, 2023

(65) Prior Publication Data
US 2024/0117832 A1   Apr. 11, 2024

Related U.S. Application Data

(60) Provisional application No. 63/413,249, filed on Oct. 5, 2022.

(51) Int. Cl.
| | | |
|---|---|---|
| F16B 19/10 | (2006.01) | |
| F16B 13/08 | (2006.01) | |

(52) U.S. Cl.
CPC ............ *F16B 19/109* (2013.01); *F16B 13/08* (2013.01)

(58) Field of Classification Search
CPC .............................. F16B 19/109; F16B 13/08
See application file for complete search history.

(56) References Cited

U.S. PATENT DOCUMENTS

| | | | |
|---|---|---|---|
| 6,776,734 B2* | 8/2004 | van Nimwegen | A63B 63/08 473/481 |
| 8,875,451 B1* | 11/2014 | Parduhn | E04H 12/2223 52/165 |
| 10,077,893 B1* | 9/2018 | Abraham | E04H 12/2223 |
| 2008/0008555 A1* | 1/2008 | Ardern | E04H 12/2223 411/411 |

* cited by examiner

*Primary Examiner* — Bayan Salone

(57) ABSTRACT

A removable blind fastener comprising an anchor having anchor members each having a threaded outer surface and a retainer section, and an anchor drive mechanism comprising a shaft having a top portion with a threaded section. The retainer section has a periphery that extends beyond a periphery of the elongated body. The anchor in a closed configuration is inserted through a frontal face of a hole on a work piece such that the retainer sections are positioned behind a rear face of the hole. The anchor is then set in an open configuration and the shaft is placed irrotatably between the anchor elements. A head having internal threads is engaged to the threaded outer surface and the threaded section such that rotation of the head causes a retraction of the anchor till at least a part of the retainer sections abuts the rear face of the hole.

18 Claims, 12 Drawing Sheets

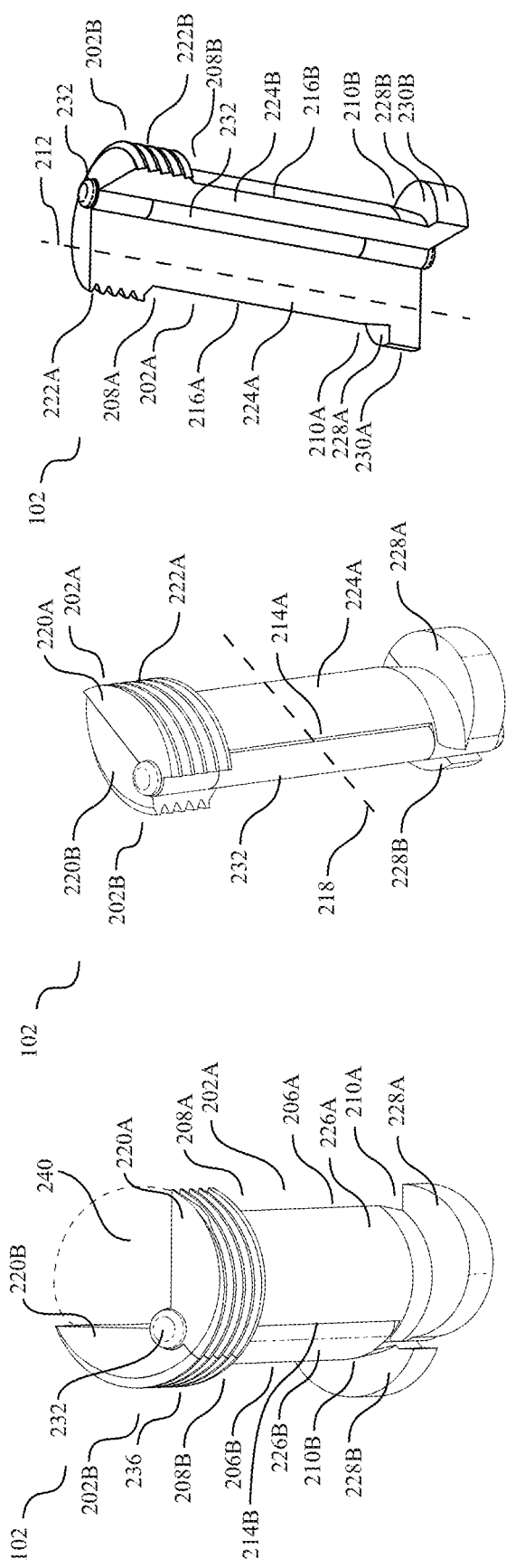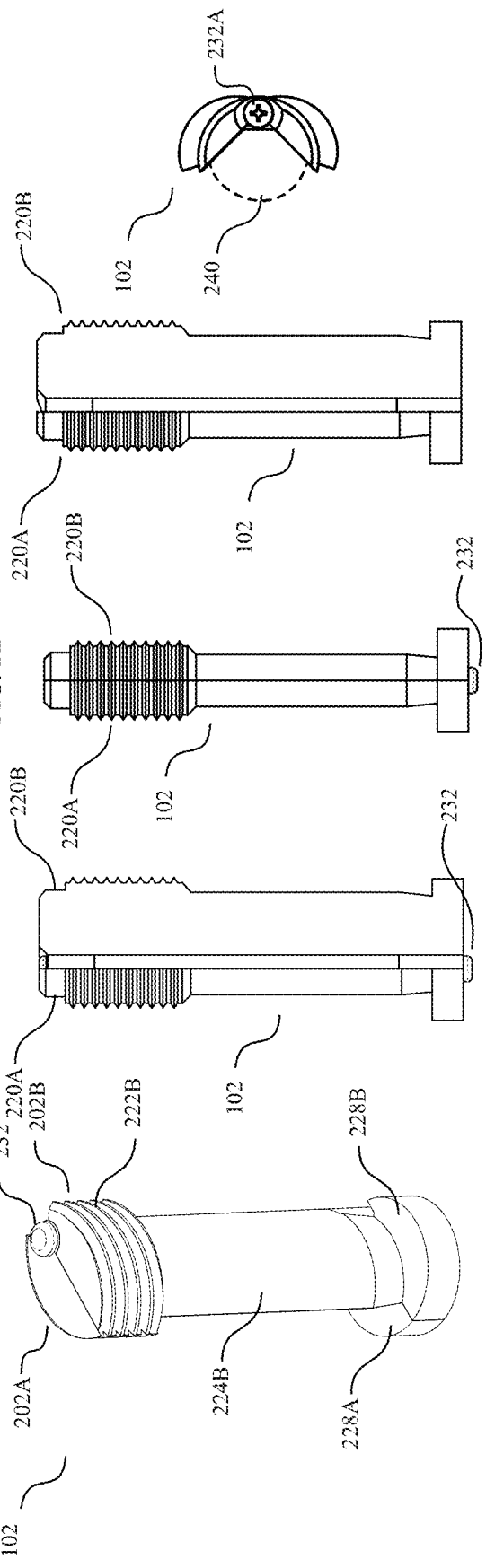

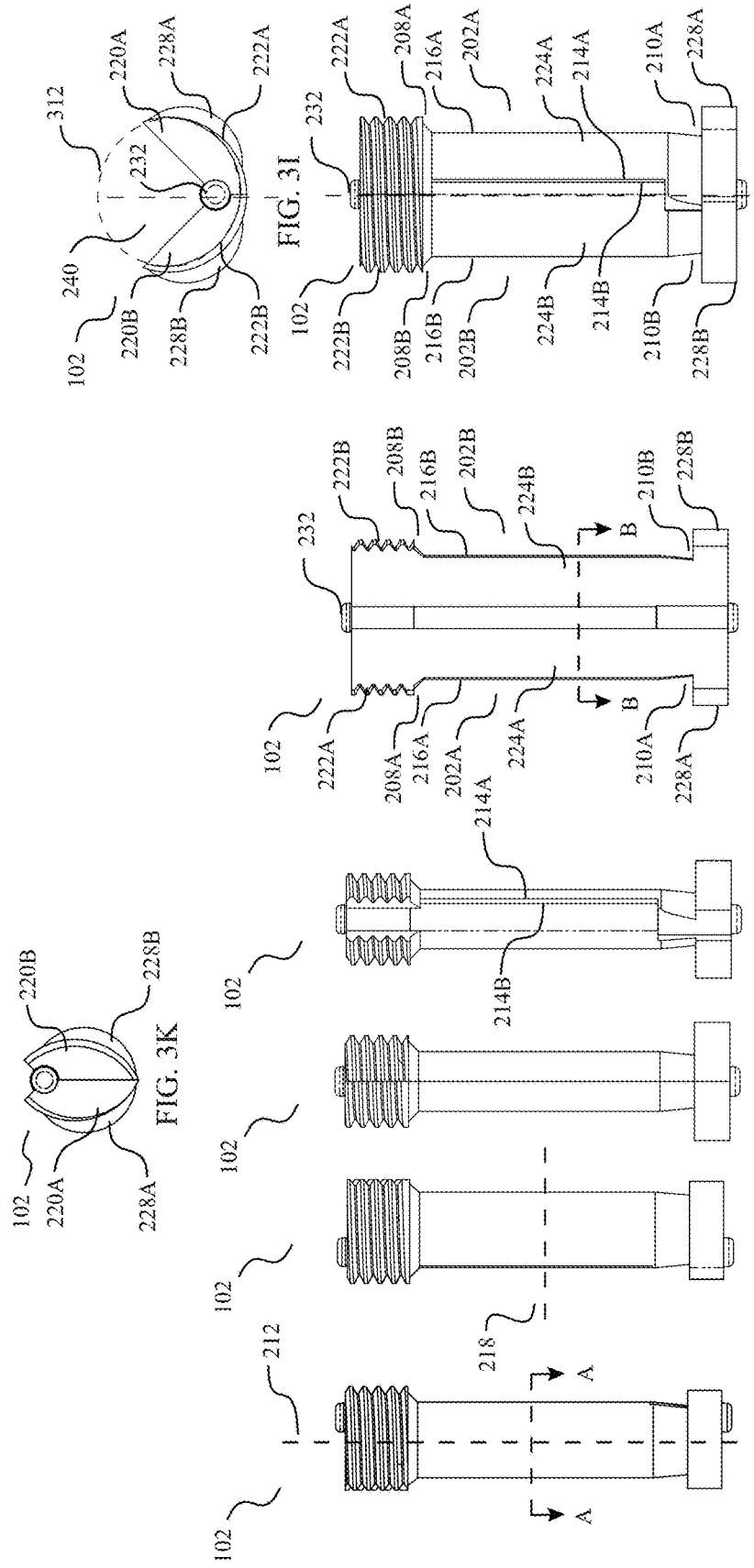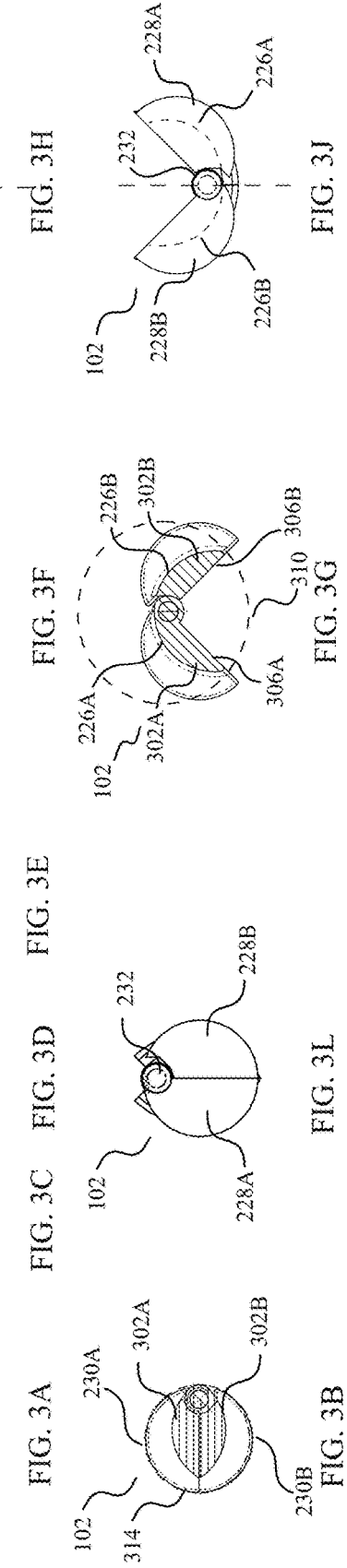

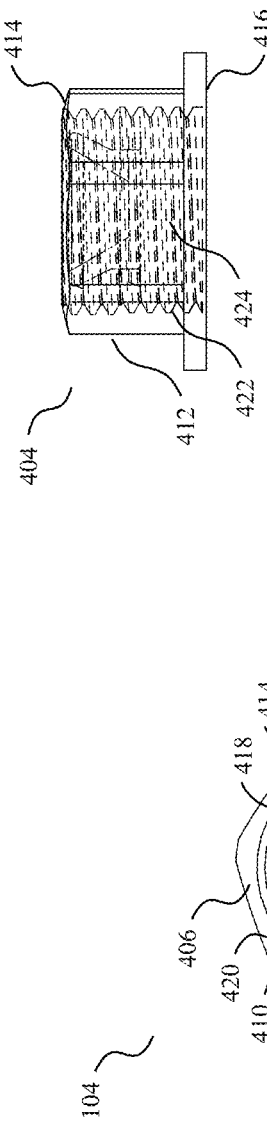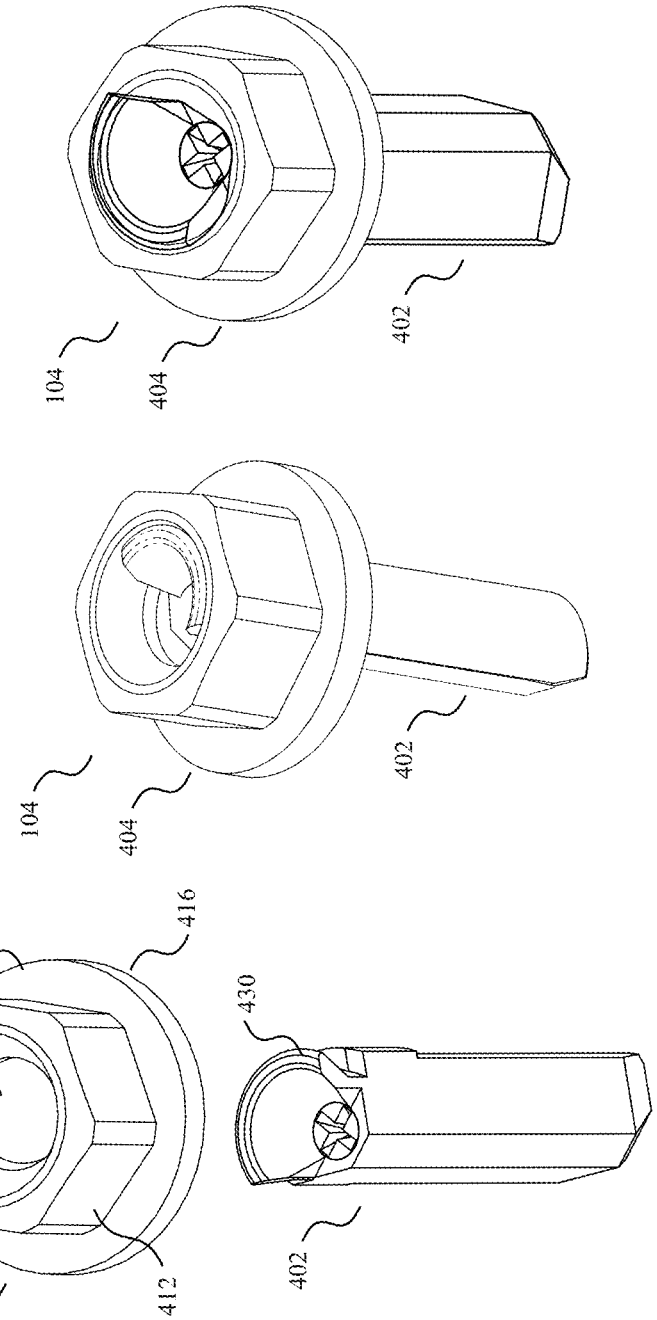
FIG. 4C
FIG. 4D
FIG. 4B
FIG. 4A

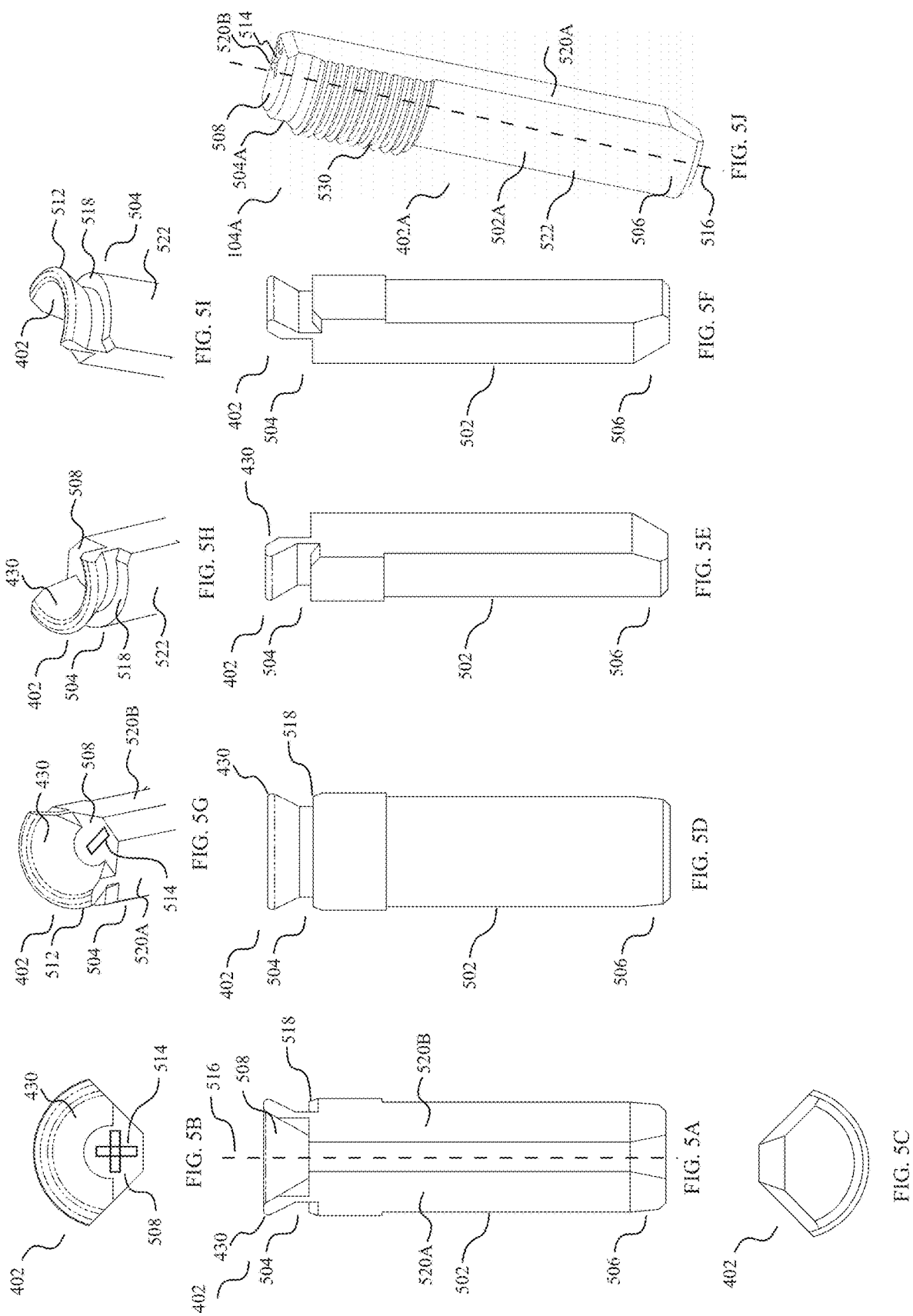

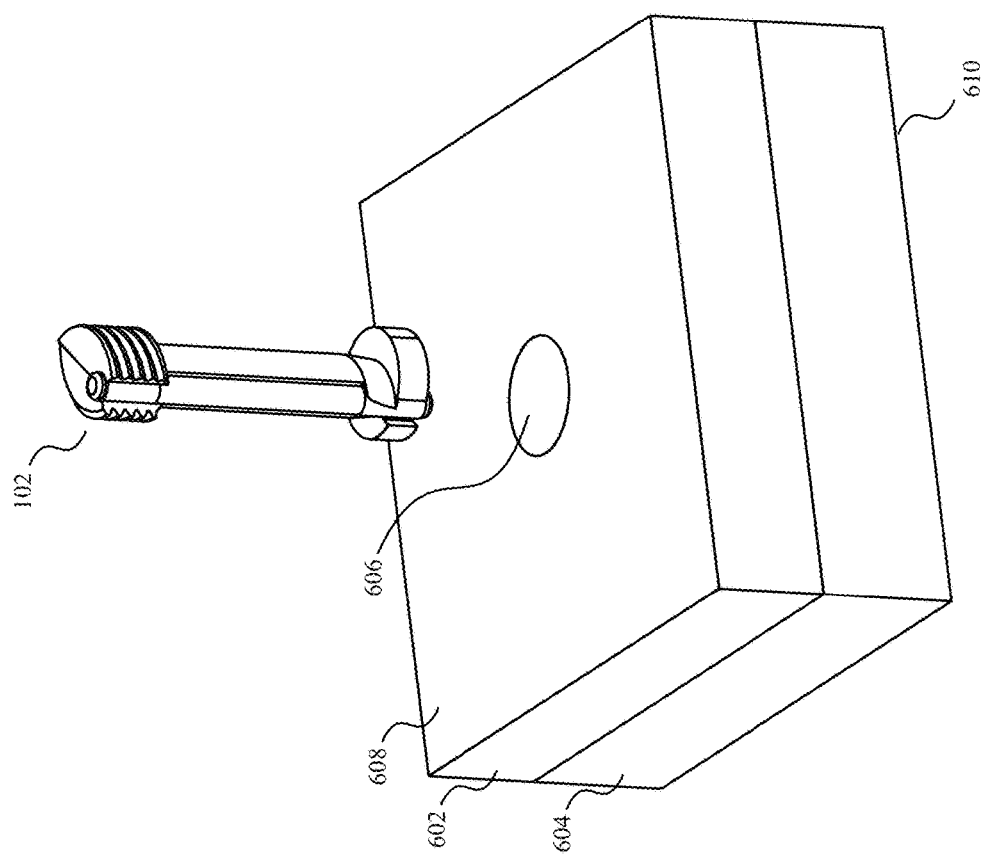

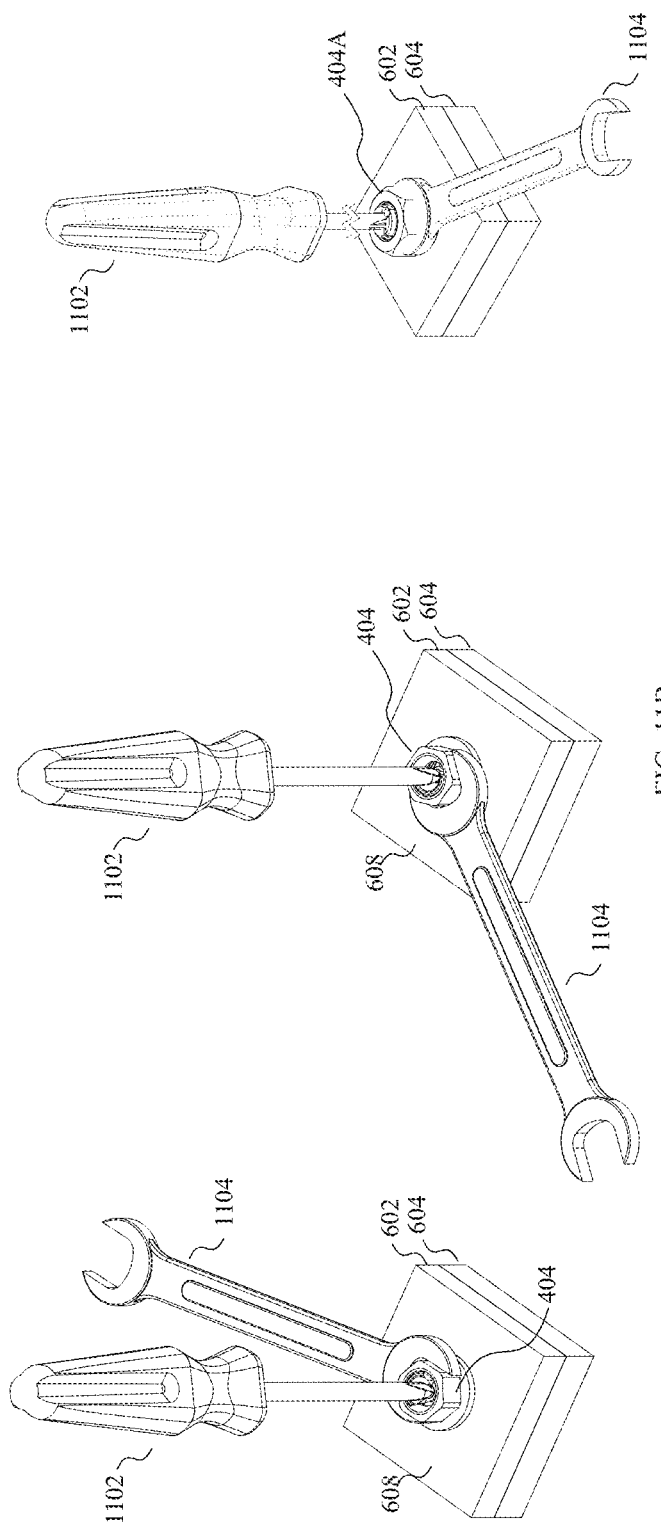
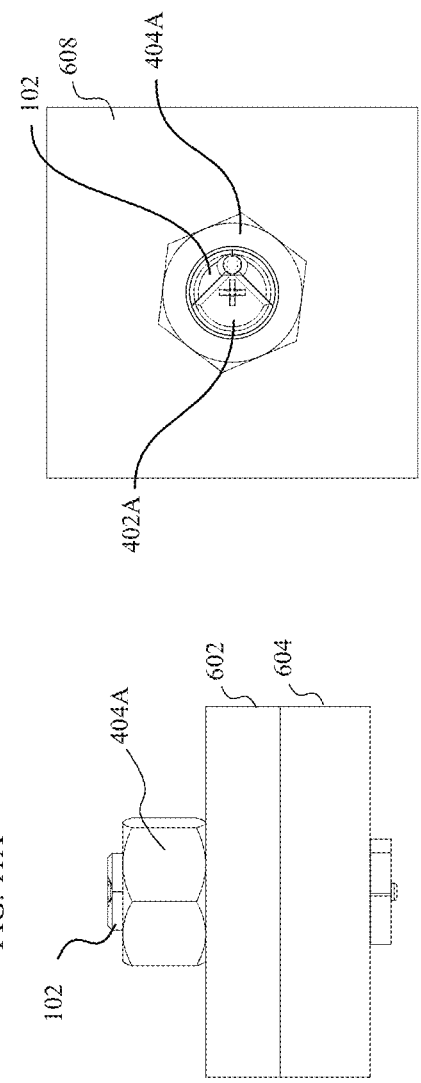

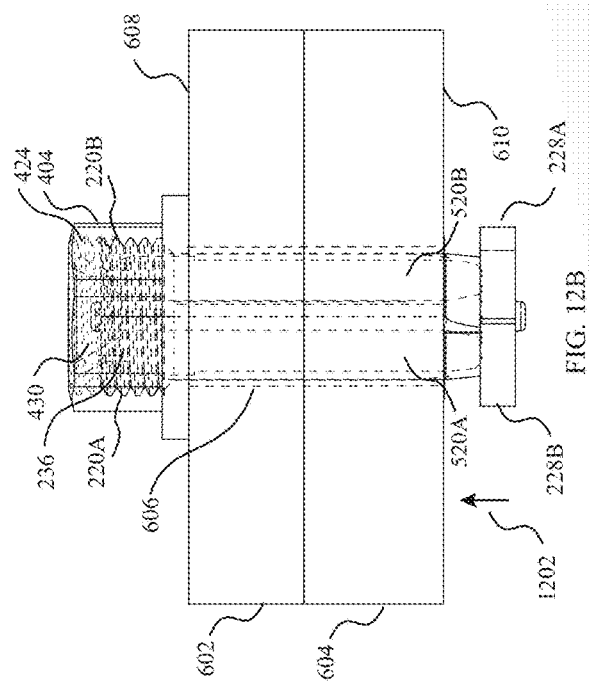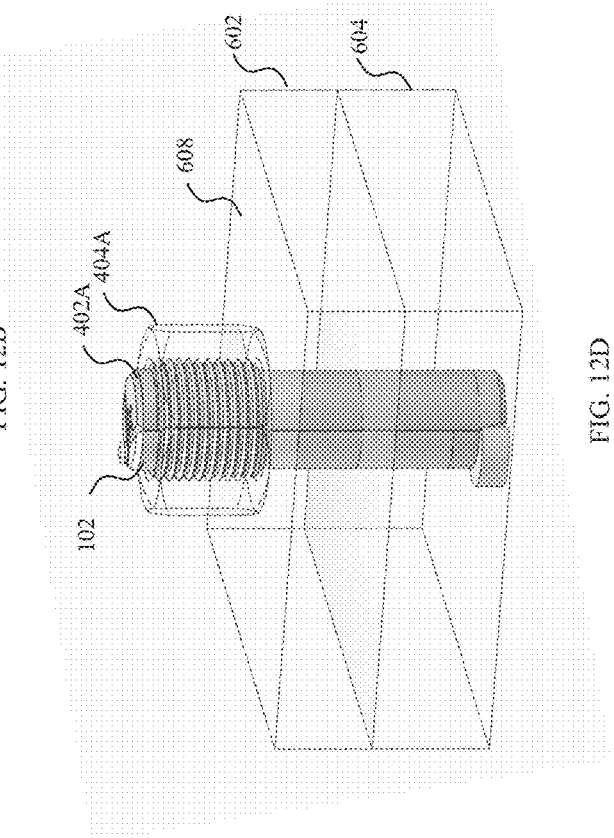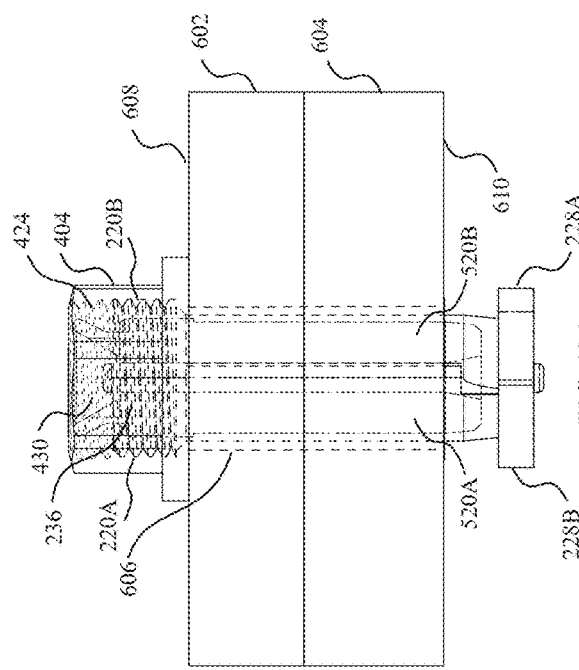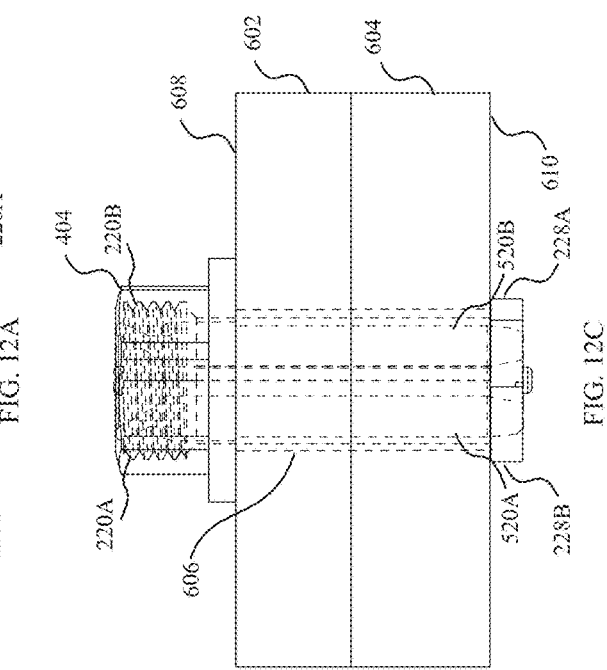

REMOVABLE BLIND FASTENER

CROSS-REFERENCE TO RELATED APPLICATIONS

This application claims the benefit of U.S. Provisional Application No. 63/413,249, filed Oct. 5, 2022, the contents of which are incorporated herein by reference.

FIELD OF THE INVENTION

The present invention relates to fastening devices. More particularly, the present invention relates to fasteners used in situations where access from only one side of the joint material is available.

BACKGROUND OF THE INVENTION

Conventional fasteners such as a bolt/screw and a nut combination require access from both sides of the material being fastened for installation. In some occasions, there is limited or no access to the inner surface of the structure for the placement of such fasteners. Different types of blind fasteners are available in the market for such applications. A toggle bolt is one type of such blind fastener which comprises a nut and spring loaded wing toggles. The toggle bolt mechanism is inserted through a hole in the materials to be held together, and when the toggle exits the other side, the wings expand, thus preventing the mechanism from coming back through the hole. Installation of toggle fastener is generally a time-consuming process and the fasteners are non-removable. Even the toggle fasteners which are claimed to be reusable are, in fact, not at all easy to remove once installed. Then there are some blind fasteners which have deformable external fins provided on a slotted expansible sleeve. The sleeve is expanded by drawing a conical nut into it by means of a threaded bolt. But, again, these types of fasteners are not removable and tooling requirement is also high. The same problems exist with rivets. Even those one-sided fasteners which rely on collapsible washers to provide the support from the inaccessible side suffer from the drawback of specialized tooling requirement. Also, some existing blind fasteners are not strong enough to withstand both axial and shear loads. For example, coiled spring pin type blind fasteners can provide resistance against shear load only and not against axial load.

Thus, there exists a need for a fastening device which can overcome the above-mentioned problems associated with one-sided fasteners or blind fasteners.

OBJECT OF THE INVENTION

An object of the present invention is to provide a removable one-sided fastener.

Yet another object of the present invention is to provide a high-strength blind fastener capable of withstanding axial and shear loads.

Still another object of the present invention is to provide a blind fastener which requires no specialized tool for installation and removal.

Another object of the present invention is to provide a cost-effective blind fastener.

Yet another object of the present invention is to provide an easy to install blind fastener.

Another object of the present invention is to provide a safe and secure blind fastener.

Yet another object of the present invention is to provide a re-usable blind fastener. Still another object of the present invention is to provide a blind fastener that does not damage the work pieces while fastening or removal.

These as well as other objects of the present invention are apparent upon inspection of this specification, including the drawings attached hereto.

SUMMARY OF THE INVENTION

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

Present invention is directed to an easy-to-install reusable blind fastener for installation in one or more work pieces. The removable blind fastener of the present invention comprises an anchor and an anchor drive mechanism and the anchor comprises a plurality of anchor members. Each of the anchor members has a proximal end with a threaded outer surface, a distal end with a retainer section and an elongated body interposed between the proximal end and the distal end. A retainer outer face of the retainer section extends beyond an elongated body outer face of the elongated body. Each anchor member is rotatably coupled to at least one other anchor member. The retainer sections of the anchor are so sized and dimensioned that, when the anchor is in a closed condition, the retainer sections pass through a hole or an aperture of the work pieces to be fastened together. In the fully inserted condition, the threaded outer surfaces of the anchor members remain outside the hole on the accessible side/frontal side of the work pieces whereas the retainer sections remain outside the other end of the hole on the rear side of the work pieces. The anchor is then required to be set in open configuration so that the anchor members are positioned in a facing relationship defining an opening therebetween extending through the proximal end to the distal end. In the open configuration the retainer outer faces, which remain outside the hole on the rear side, extend beyond the diameter of the hole. The anchor drive mechanism is then coupled to the anchor. The anchor drive mechanism comprises a shaft having a top portion with a threaded section. The shaft is dimensioned to be irrotatably and translationally received in the opening of the anchor placed in open configuration. In one embodiment of the anchor drive mechanism, a head is rotatably coupled to the top portion of the shaft. In another embodiment, the head is not an integral part of the anchor drive mechanism and a commonly used nut can be used as the head. A head interior surface of the head defines a bore extending from a top head end to a bottom head end of the head with an internal thread disposed over at least a portion of the bore. For coupling with the anchor which is in open configuration inside the hole, the shaft of the anchor drive mechanism is inserted into the opening of the anchor from the proximal side of the anchor. The head is then positioned over a substantially continuous external thread formed by the threaded outer surfaces of the anchor and the threaded section of the shaft. When the head is rotated the internal thread of the head engage with the substantially continuous external thread and causes a retraction of the anchor till at least a part of the retainer sections abuts the rear face of the hole and inhibits further translational movement of the anchor relative to the head thereby fastening the work pieces together.

BRIEF DESCRIPTION OF DRAWINGS

In order to describe the manner in which features and other aspects of the present disclosure can be obtained, a more particular description of certain subject matter will be rendered by reference to specific embodiments which are illustrated in the appended drawings. Understanding that these drawings depict only typical embodiments and are not therefore to be considered to be limiting in scope, nor drawn to scale for all embodiments, various embodiments will be described and explained with additional specificity and detail through the use of the accompanying drawings in which:

FIG. 2A is a top perspective view of the anchor in open condition in accordance with an embodiment of the present invention;

FIG. 2B is a top perspective view of the anchor in closed condition in accordance with an embodiment of the present invention;

FIG. 2C is another top perspective view of the anchor in open condition in accordance with an embodiment of the present invention;

FIG. 2D is another top perspective view of the anchor in closed condition in accordance with an embodiment of the present invention;

FIG. 2E is a front view of the anchor with a longer threaded section in open condition, a pin being used as a coupling element in this embodiment;

FIG. 2F is a front view of the anchor of FIG. 2E in closed condition;

FIG. 2G is a front view of the anchor in open condition with a screw being used as a coupling element;

FIG. 2H is a top view of the anchor of FIG. 2G in open condition;

FIG. 3A is a right side view of the anchor in closed condition in accordance with an embodiment of the present invention;

FIG. 3B is a cross-sectional view of the anchor in closed condition in accordance with an embodiment of the present invention taken along plane A-A of FIG. 3A;

FIG. 3C is a left side view of the anchor in closed condition in accordance with an embodiment of the present invention;

FIG. 3D is a front view of the anchor in closed condition in accordance with an embodiment of the present invention;

FIG. 3E is a rear side view of the anchor in closed condition in accordance with an embodiment of the present invention;

FIG. 3F is a front side view of the anchor in open condition in accordance with an embodiment of the present invention;

FIG. 3G is a cross-sectional view of the anchor in open condition in accordance with an embodiment of the present invention taken along plane B-B of FIG. 3F;

FIG. 3H is a rear side view of the anchor in open condition in accordance with an embodiment of the present invention;

FIG. 3I is a top side view of the anchor in open condition in accordance with an embodiment of the present invention;

FIG. 3J is a bottom side view of the anchor in open condition in accordance with an embodiment of the present invention;

FIG. 3K is a top side view of the anchor in closed condition in accordance with an embodiment of the present invention;

FIG. 3L is a bottom side view of the anchor in closed condition in accordance with an embodiment of the present invention;

FIG. 4A is a top side perspective view of a head and a shaft of an anchor drive mechanism in accordance with an embodiment of the present invention;

FIG. 4B is a top side perspective view of an anchor drive mechanism in accordance with an embodiment of the present invention;

FIG. 4C is another top side perspective view of an anchor drive mechanism in accordance with an embodiment of the present invention;

FIG. 4D is a front side view of a head of an anchor drive mechanism in accordance with an embodiment of the present invention;

FIG. 5A is a front side view of a shaft of an anchor drive mechanism in accordance with an embodiment of the present invention;

FIG. 5B is a top side view of a shaft of an anchor drive mechanism in accordance with an embodiment of the present invention;

FIG. 5C is a bottom side view of a shaft of an anchor drive mechanism in accordance with an embodiment of the present invention;

FIG. 5D is a rear side view of a shaft of an anchor drive mechanism in accordance with an embodiment of the present invention;

FIG. 5E is a right side view of a shaft of an anchor drive mechanism in accordance with an embodiment of the present invention;

FIG. 5F is a left side view of a shaft of an anchor drive mechanism in accordance with an embodiment of the present invention;

FIG. 5G is a top front perspective view of a top portion of the shaft of an anchor drive mechanism in accordance with an embodiment of the present invention;

FIG. 5H is a top right perspective view of a top portion of the shaft of an anchor drive mechanism in accordance with an embodiment of the present invention;

FIG. 5I is a top left perspective view of a top portion of the shaft of an anchor drive mechanism in accordance with an embodiment of the present invention;

FIG. 5J is a front right perspective view of a second embodiment of the anchor drive mechanism;

FIG. 6 illustrates an anchor in closed condition being inserted into a hole of work pieces in accordance with an embodiment of the present invention;

FIG. 11A illustrates a top perspective view of a head of an anchor drive mechanism being rotated while holding its shaft stationary in accordance with an embodiment of the present invention;

FIG. 11B illustrates another top perspective view of a head of an anchor drive mechanism being rotated while holding its shaft stationary in accordance with an embodiment of the present invention;

FIG. 11C illustrates a top perspective view of an independent head being rotated over the second embodiment of the anchor drive mechanism while holding the shaft stationary in accordance with an embodiment of the present invention;

FIG. 11D illustrates a front view of the removable blind fastener having the anchor and the second embodiment of the anchor drive mechanism fastened to workpieces;

FIG. 11E illustrates a top view of the removable blind fastener having the anchor and the second embodiment of anchor drive mechanism fastened to workpieces;

FIGS. 12A-12C illustrate front views of the removable blind fastener progressively fastening two work pieces together in accordance with an embodiment of the present invention; and FIG. 12D illustrates front perspective view of the removable blind fastener having the anchor and the second embodiment of the anchor drive mechanism fastened to workpieces.

DETAILED DESCRIPTION OF THE INVENTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein. Accordingly, it is intended that the present invention covers such modifications and variations as come within the scope of the appended claims and their equivalents.

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Specific embodiments of the present invention are now described with reference to the figures, wherein like reference numbers indicate identical or functionally similar elements. The terms "distal" and "proximal" are used in the following description with respect to a position or direction. "Distal" or "distally" are a position distant from or in a direction away from a reference point. "Proximal" and "proximally" are a position near or in a direction toward the reference point. In addition, as used herein, the terms "outward" or "outwardly" refer to a position radially away from a longitudinal axis of a reference body and the terms "inward" or "inwardly" refer to a position radially toward a longitudinal axis of the reference body.

Figure 1B:
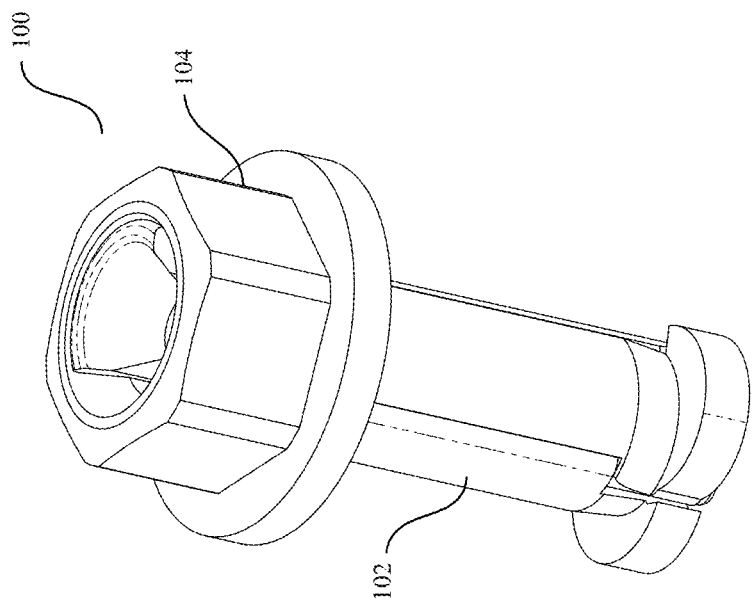
FIG. 1B is another top perspective view of the removable blind fastener in accordance with an embodiment of the present invention.
Figure 1A:
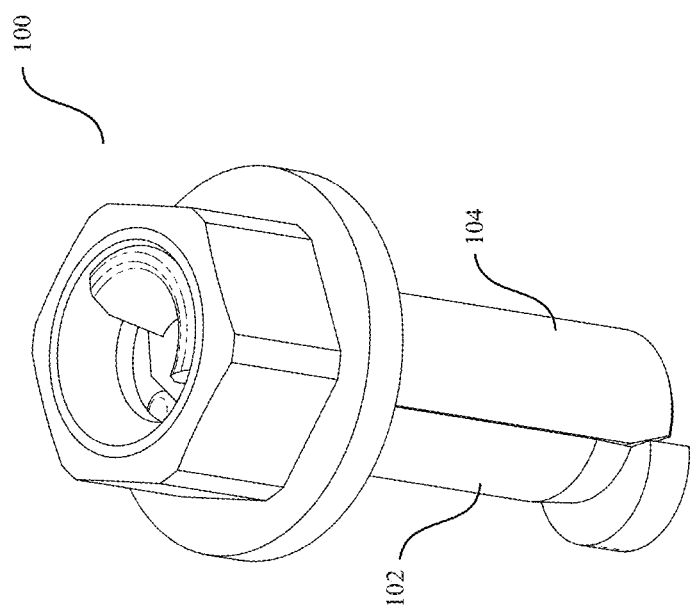
FIG. 1A is top perspective view of the removable blind fastener in accordance with an embodiment of the present invention.

The removable blind fastener 100 of the present invention, as illustrated in FIGS. 1A and 1B, comprises an anchor 102 and an anchor drive mechanism (embodiments 104 and 104A). Reference to FIGS. 2A-2H, even though, the present invention is described herein with reference to an anchor comprising only two numbers of anchor members 202A and 202B, the anchor can have more than two anchor members or a plurality of anchor members and will still work in the same way. Each of the anchor members (202A or 202B, for example) has a general shape and cross-sectional configuration that are similar to each other.

Reference to FIGS. 2A-2H and 3A-3L, an anchor member 202A is made of a main body 206A (206B for 202B) which extends, along a longitudinal axis 212 (shown in FIG. 2C), from a proximal end 208A (208B for 202B) to a distal end 210A (210B for 202B) and, along a transverse axis 218 (shown in FIG. 2B), from a first lateral edge 214A (214B for 202B) to a second lateral edge 216A (216B for 202B). The main body 202A (or 202B) comprises a threaded section 220A (220B for 202B) disposed at the proximal end 208A (208B for 202B), a retainer section 228A (228B for 202B) disposed at the distal end 210A (210B for 202B) and an elongated body 224A (224B for 202B) interposed between the proximal end 208A (208B for 202B) and the distal end 210A (210B for 202B).

The elongated body 224A (224B for 202B) has a curvilinear cross-section 302A (302B for 202B) taken along a plane perpendicular to the longitudinal axis 212 as shown in FIGS. 3B and 3G. The curvilinear cross-section 302A comprises a substantially planar inner face 306A (306B for 202B) and an arcuate elongated body outer face 226A (226B for 202B). The elongated body outer face 226A (226B for 202B), in a preferred embodiment, is a radial outer periphery in the form of an arc of a circle in a transverse section. The threaded section 220A (220B for 202B) and the retainer section 228A (228B for 202B) also have similar curvilinear cross-sectional profiles as that of the cross-section 302A (302B for 202B) of the elongated body 224A or 224B. In a preferred embodiment, the planar inner face 306A (306B for 202B) extends from the proximal end 208A (208B for 202B) and to the distal end 210A (210B for 202B).

Reference to FIGS. 2A-2D and 3A-3L, the threaded section 220A (220B for 202B) has an arcuate threaded outer surface 222A (222B for 202B) which, in a preferred embodiment, is a radial outer periphery in the form of an arc of a circle in a transverse section. External threads are disposed over at least a portion of the threaded outer surface 222A (222B for 202B). The retainer section 228A (228B for 202B) has a retainer outer face 230A (230B for 202B) which projects radially outwardly beyond the elongated body outer face 226A (226B for 202B) and its outer periphery forms an arc of a circle.

In FIGS. 2E-2G, the threaded sections 220A and 220B of the anchor 102 are longer in length than those shown in case of the anchor 102 in FIGS. 2A-2D, 3A, 3C-3F and 3H.

Reference to the FIGS. 2A-2H and 3A-3L, a coupling element 232 (screw, pin or other similar coupler) is used to rotatably couple each of the anchor elements (202A, for example) with at least another anchor element (202B, for example) and the anchor elements are arranged with the planar faces (306A and 306B, for example) facing inward. The coupling element 232 can extend throughout the length of the anchor elements 202A or 202B as a single element (a pin, for example as shown in FIGS. 2A-2F) or up to a part of them (two pins or screws—one from top and one from bottom, for example as shown in FIG. 2H). In the present example, the coupling of the anchor elements 202A and 202B is done with the help of the coupling element 232 disposed along the first lateral edges 214A and 214B. In some embodiments, the first lateral edges 214A and 214B are configured to at least partially overlap each other in the open configuration of the anchor 102.

FIGS. 2A, 2C, 2E, 2G, 2H and 3F-3I show the anchor 102 in an open condition or open configuration in which anchor elements 202A and 202B are in a facing relationship i.e. the planar inner faces 306A and 306B face each other. In the open configuration, the anchor elements 202A and 202B define an opening or passage 240 between the planar inner faces 306A and 306B extending from the proximal ends 208A and 208B to the distal ends 210A and 210B.

In the same open configuration, as shown in FIG. 3I, the threaded outer surfaces 222A and 222B of the threaded sections 220A and 220B form a substantially continuous external thread 236 (indicated in FIG. 2A). The substantially continuous external thread 236 in the open configuration forms a periphery which is substantially at least a portion of a second circle 312 (shown in FIG. 3I).

The anchor 102 is configured to be transitioned from the open configuration to a closed configuration simply by manually rotating the anchor elements 202A and 202B inwardly with the planar inner faces 306A and 306B facing each other. In a closed configuration, the planar inner faces 306A and 306B of the anchor elements 202A and 202B remain in an abutting relationship and, as shown in FIG. 3B, the retainer outer faces 230A and 230B form at least a portion of a third circle 314.

The anchor drive mechanism, in the embodiment 104 shown in FIGS. 4A-4C, comprises a shaft 402 and a head 404 whereas, in another embodiment 104A, as shown in FIG. 5J, the anchor drive mechanism comprises a shaft 402A only. Reference to FIGS. 5A-5J, the shaft 402/402A has an elongated shaft body 502/502A which defines a top portion 504/504A and a bottom portion 506 spaced from the top portion 504/504A along a longitudinal axis 516. The shaft body 502/502A is dimensioned to be irrotatably and translationally received in the opening created by the anchor members 202A and 202B when the anchor 102 is kept in the open configuration. The cross-section of the shaft body 502/502A should conform to the cross-section of the opening 240 (shown in FIGS. 2A and 3I) so that no or minimum space/clearance is left between the forward sides of the shaft body 502/502A and the planar inner faces (306A and 306B, in the present example) of the anchor 102 when the shaft body 502/502A is inserted in the opening 240 (shown in FIGS. 2A and 3I). This dimensional conformity between the cross-sections of the shaft body 502/502A and the opening 240 is required to ensure that no substantial relative rotational movement of the anchor 102 occurs with respect to the anchor drive mechanism 104/104A in assembled condition.

In the present example, the anchor 102 is shown to have just two anchor elements/members 202A and 202B and the cross-section of the opening 240 (shown in FIGS. 2A and 3I) takes the form of a sector of a circle with two straight sides and one curved out third side if the anchor is kept in the open configuration inside a circular hole of a work piece. The two straight sides of the sector-of-a-circle shaped cross-section of the opening 240, which correspond to the planar inner faces of the anchor 102, are the radii of the first circle 310 (shown in FIG. 3G). In the present example, the shaft body 502/502A is also dimensioned to have a cross-section of the shape of a sector of a circle, so that, once inserted in to the opening 240, cross-section of the shaft body 502/502A conforms to the cross-section of the opening 240 and the arc of the cross-section of the shaft body 502/502A completes the sector of the first circle 310. In the present example, the shaft body 502/502A defines two forward sides 520A and 520B (shown in FIGS. 5A, 5G and 5J) and a curved rear side 522 (shown in FIGS. 5H, 5I and 5J).

Whether the anchor 102 comprises just two anchor members as discussed above or has more than two anchor members, the shaft body is so sized and dimensioned that the anchor members and the shaft body together form a generally cylindrical shaped body. The shaft body 502/502A can be equal to, shorter or longer than the anchor 102. But, the length of the shaft body 502/502A should be long enough to provide sufficient area of contact with the anchor elements so that the anchor does not rotate relative to the shaft 402.

In the embodiment 104, the top portion 504 of the shaft body 502 comprises a top valley 508 and a skirt 430 that flares outward away from the top valley 508 as illustrated in FIGS. 4A and 5A to M. In a preferred embodiment, the skirt 430 is generally frustoconical in shape and extends at least partially around the top valley 508 on the curvilinear/curved side of the shaft 104. The skirt 430 originates at least marginally inwardly from the periphery of the top valley 508 leaving a top valley edge 518 around the base of the skirt 430. An arc shaped lip 512 is defined by the skirt 430. In the embodiment 104A of the anchor drive mechanism, as shown in FIG. 5J, the top portion 504A comprises a threaded section 530 on the curved rear side 522 and the two forward sides 520A and 520B extending up to the top valley 508. As with shaft body 502, the shaft body 502A is also dimensioned to have a cross-section of the shape of a sector of a circle, so that, once inserted in to the opening 240, cross-section of the shaft body 502A conforms to the cross-section of the opening 240 and the threads of the anchor drive mechanism threaded section 530 complete the threads of the threaded outer surface 222A and 222B to make a continuous thread. In both the embodiments 104 and 104A, a tool grip member 514 (two different exemplary possible dimensions of an indent type grip member 514 are shown in FIGS. 5B and 5G) is disposed on the top valley 508 which is compatible with screw driving tools i.e. which can receive tip of tools such as screwdrivers (flathead or Phillips screwdriver, for example), socket head cap or alien wrench or is compatible with a tool such as pliers or any similar tools that can hold the grip member 514 firmly when the grip member 514 projects outward from the valley 508 instead of being a recessed indent type grip. The bottom portion 506 of the shaft body 502/502A is preferably made to have an area of cross-section smaller than an area of cross-section of the shaft body 502/502A to facilitate insertion of the shaft body 502/502A into the opening 240.

Figure 9B:
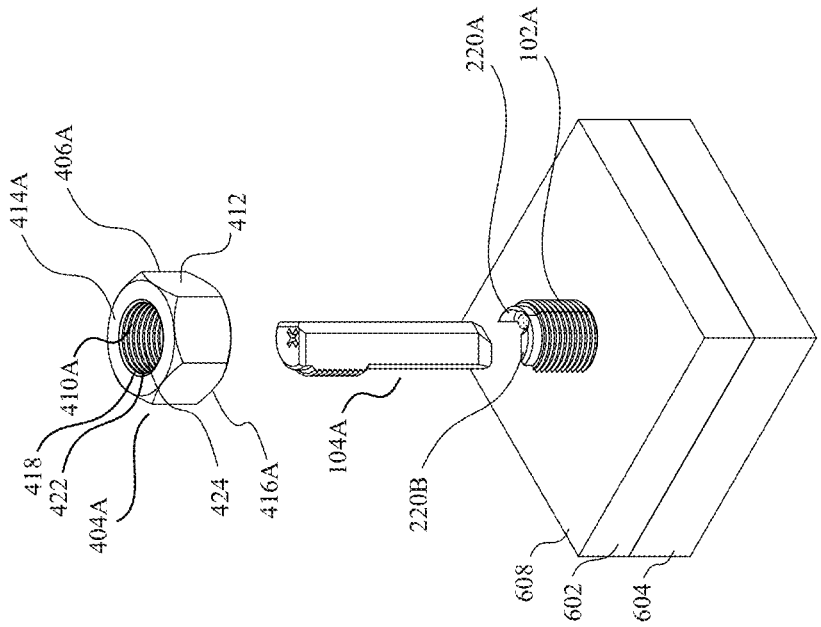
FIG. 9B illustrates an exploded view of the removable blind fastener having the second embodiment of the anchor drive mechanism shaft being inserted into the hole of work pieces with an anchor placed in open condition therein and a separate head placed over the shaft.

The head 404 of the anchor drive mechanism embodiment 104, as illustrated in FIGS. 4A-4D, comprises a head body 406 and an optional washer section 408. In another embodiment, the head 404A, as shown in FIG. 9B, comprises the head body 406A only. In case of the embodiment 104A of the anchor drive mechanism, the head 404A is not an integral part of the removable blind fastener 100 and any commonly available nut can be used as head 404A. In either case, the head body 406/406A defines a head interior surface 410A, a head exterior surface 412, a top head end 414/414A and a bottom head end 416/416A. The head interior surface 410/410A defines a bore 418 extending from the top head end 414A to the bottom head end 416A. In embodiment 104, the bore 418 on the top head end 414 is configured to have a frustoconical shape so that it acts as a countersink head 420 to receive the skirt 430 of the shaft body 502. An annular inside 422 having an inside diameter closely matching the second circle 312 (formed by the continuous external thread 236 of the anchor 102 in the open configuration) is defined by the head interior surface 410 underneath the countersink head 420 in the bore 418. The space between the countersink head 420 and the annular inside 422 is so defined that the threaded outer surfaces 222A and 222B of the anchor 102 can go as close as possible up to the top head end 414 in threaded engagement, when needed, to allow maximum possible retraction of the anchor 102. For both the versions of the head 404 and 404A, internal threads 424 configured to engage the external thread, particularly the continuous external thread 236 formed by the threaded outer surfaces 222A and 222B of the anchor 102 in open configuration, are disposed over at least a portion of the bore 418 on the annular inside 422. The head exterior surface 412 defines a grippable surface to enable gripping of the head body 406 by a tool or by hand of a user. Present example illustrates a hexagonal grippable surface. In the head 404, the washer section 408 is disposed below the head body 406 to distribute axial and shear loads over a larger area when the removable blind fastener 100 is installed. Additional washers can be added between the head 404 and the work piece, as many as needed, to add structural strength and/or to account for any difference in the diameter of the hole of the workpiece and the outer faces 226A and 226B of the main body (206A and 206B) in open configuration when installed, or to make up for any gap between the bottom head end 416/416A of head 404/404A and the surface 608 of the work piece which the head 404/404A is supposed to abut in a fastened condition. In some embodiments, the head exterior surface 412 may be made countersunk shaped i.e. tapering from the top head end 414 to the bottom head end 416 so that the head 404 rests flush with the surface into which it is installed. Also, in some other embodiments, the head 404 may be made to act as a blind nut, cap nut, cup nut or an acorn nut with the top head end 414 closed so that ingress of water can be prevented. In these embodiments, once the internal threads of the head 404 engage the substantially continuous external thread 236 of the anchor 102, the head 404 can be pulled outward and rotated so that the retainer sections 228A and 228B come in contact with the surface of the work pieces on the other side of hole 606 and offer resistance to rotation of the anchor drive mechanism 104.

In coupled condition, the skirt 430 of embodiment 404 engages with the countersink head 420 to enable free rotational movement between the head 404 and the shaft 402 without allowing the shaft body 502 to slip through the bore in the distal direction. The countersink head 420 engages with the top valley edge 518 to restrict translational movement of the shaft body 502 in the proximal direction. Thus, in both the versions, between the head 404/404A and the shaft 402/402A, free rotational movement is allowed but translational movement in either direction is inhibited.

Reference to FIGS. 1A-1B, 2A-2H, 3A-3L, 4A-4D and 5A-5J, to assemble the anchor 102 with the anchor drive mechanism 104, the shaft body 502/502A is inserted into the opening 240 from the proximal end 208A/208B of the anchor 102. At this position, the internal threads of the head 404 engage the substantially continuous external thread 236 of the threaded sections 220A and 220B of the anchor 102 and, in case of embodiment 104A, the internal threads of head 404A engage both the external thread 236 of the threaded sections 220A and 220B of the anchor 102 and the threads of the anchor drive mechanism threaded section 530. Rotation of the head 404/404A further engages the internal threads of the head 404/404A with the substantially continuous external thread 236 and the threads of the anchor drive mechanism threaded section 530 as well, if the embodiment 104A is used, and, as a result, the anchor 102 retracts in the proximal direction. The maximum distance by which the anchor 102 can retract is determined by the thread length of the internal thread in case of the embodiment 104. Accordingly, for any aperture or hole in which the removable blind fastener 100 is to be installed, the length of the anchor 102 and the thread length of the internal thread are to be selected suitably. But, in case of the embodiment 104A of the anchor drive mechanism, no such restriction is there as the anchor 102 (also the shaft 402A) can be retracted as much as required by using one or more common nut head 404A.

The removable blind fastener 100 of the present invention can be made available in numerous sizes having various lengths and diameters. Selection of an appropriate size of removable blind fastener 100 is made based on the diameter and depth of the hole/aperture in which the fastener 100 is to be installed taking into account the thread length of the internal thread. For example, the diameter of the third circle 314 formed by the retainer outer faces 230A and 230B in closed configuration of the anchor 102 should be less than the diameter of an aperture/hole through which the removable blind fastener 100 is to be installed.

FIG. 6 illustrates two work pieces 602 and 604 placed one over the other with an aligned hole 606 made through them from the frontal side 608 to the rear side 610. These work pieces 602 and 604 can be fastened together with the help of the removable blind fastener 100 of the present invention even when the work pieces are accessible from one side only i.e. accessible either from the frontal side 608 or from the rear side 610. For example, if the rear side 610 of the work pieces is not accessible at all then also the removable blind fastener 100 can be installed from the frontal side. FIGS. 6-9B, 10A-10D, 11A-11E and 12A-12D illustrate installation of the removable blind fastener 100 by accessing only the frontal side of the work pieces. For the purpose of clarity, in FIGS. 9A and 10A the embodiment of the anchor drive mechanism 104 is shown without the head 404 even though the head 404 remains as an integral part of the anchor drive mechanism 104 as shown in FIGS. 4B and 4C unlike the embodiment 104A wherein the head 404A is a commonly used nut such as one shown in FIG. 9B.

Figure 7:
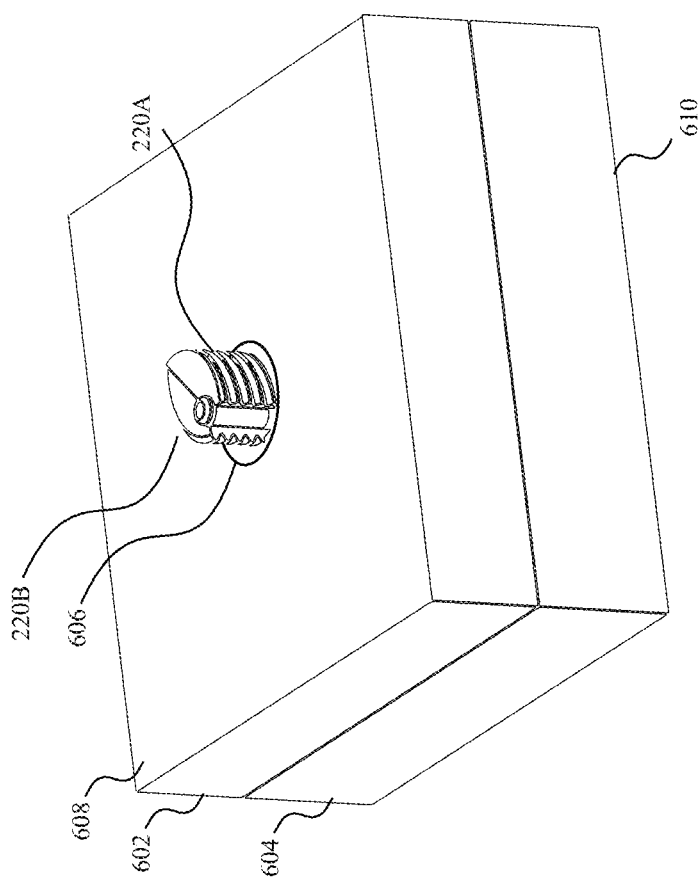
FIG. 7 illustrates the anchor in closed condition fully inserted into a hole of work pieces in accordance with an embodiment of the present invention.
Figure 8:
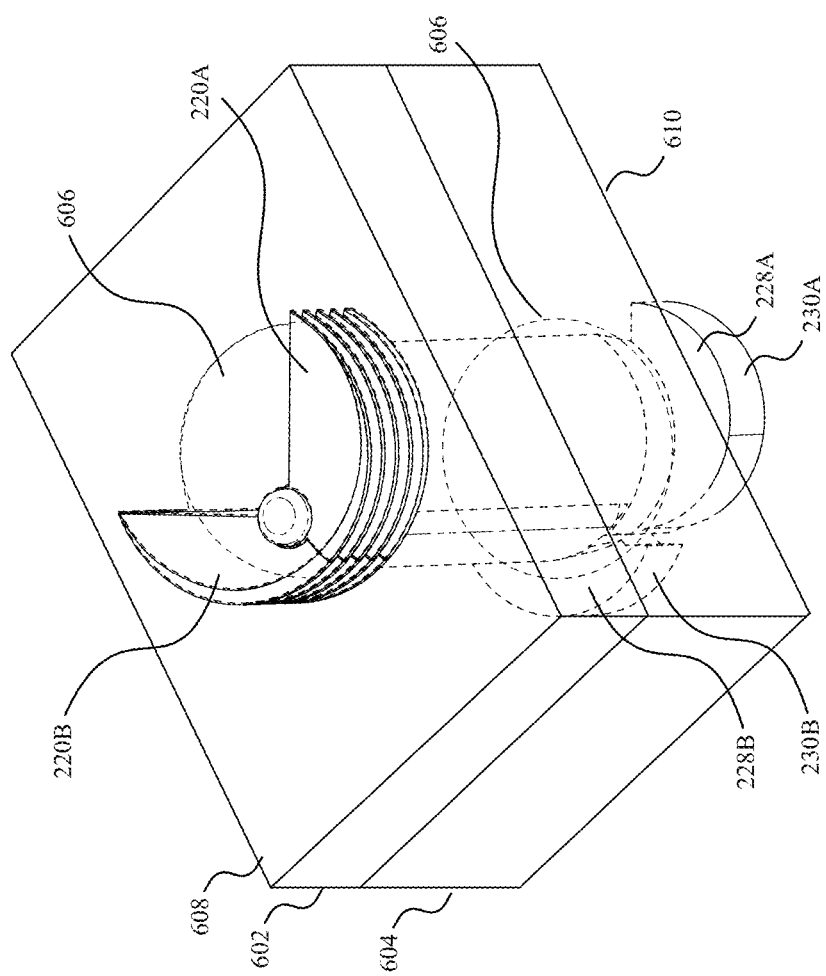
FIG. 8 illustrates a top perspective view of an anchor in open condition after being inserted into a hole of work pieces in closed condition in accordance with an embodiment of the present invention.

Continuing with the present example, for installation, as shown in FIG. 6, first the anchor 102 in closed configuration is inserted through the aligned hole 606 from the frontal side 608 of the work pieces 602 and 604. Once inserted, the threaded sections 220A and 220B remain outside the frontal face 608 of the hole 606 as shown in FIG. 7 while the retainer sections 228A and 228B remain outside the other side of hole 606 i.e. on the side of the rear face 610. The anchor members 202A and 202B are then rotated away from each other manually by a user to bring the anchor 102 to an open configuration as shown in FIG. 8. In the open configuration, the retainer outer faces 230A and 230B extend beyond the periphery of the hole 606 on the rear face side 610 as shown in FIG. 8. To make this happen, it is essential that the diameter of the third circle 314 (indicated in FIG. 3B) formed by the retainer outer faces 230A and 230B in closed configuration is not much less than the diameter of an aperture/hole 606 through which the removable blind fastener 100 is to be installed.

Figure 9A:
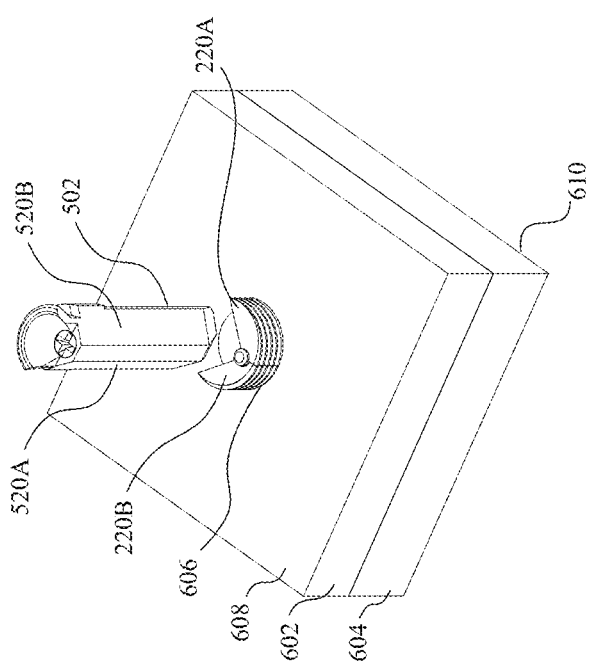
FIG. 9A illustrates a top perspective view of shaft of an anchor drive mechanism being inserted into a hole of work pieces having an anchor placed in open condition in accordance with an embodiment of the present invention.
Figure 10A:
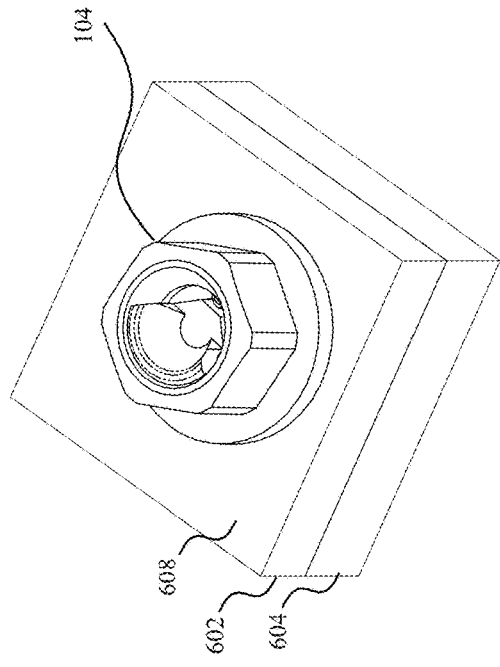
FIG. 10A illustrates a top perspective view of shaft of an anchor drive mechanism coupled with an anchor inserted into a hole of work pieces in accordance with an embodiment of the present invention.
Figure 10B:
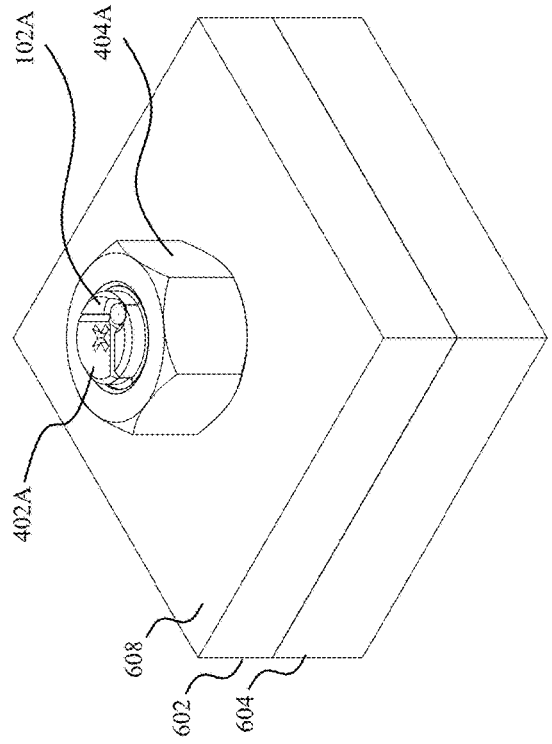
FIG. 10B illustrates another top perspective view of an anchor drive mechanism coupled with an anchor inserted into a hole of work pieces in accordance with an embodiment of the present invention.
Figure 10C:
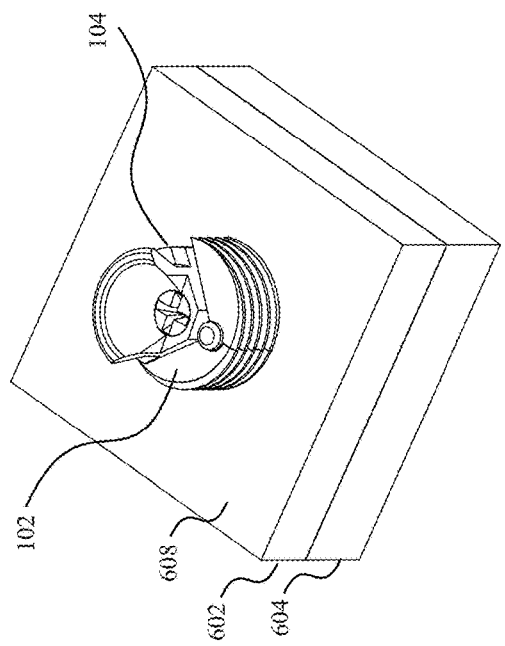
FIG. 10C illustrates a bottom perspective view of an anchor drive mechanism coupled with an anchor inserted into a hole of work pieces in accordance with an embodiment of the present invention.
Figure 10D:
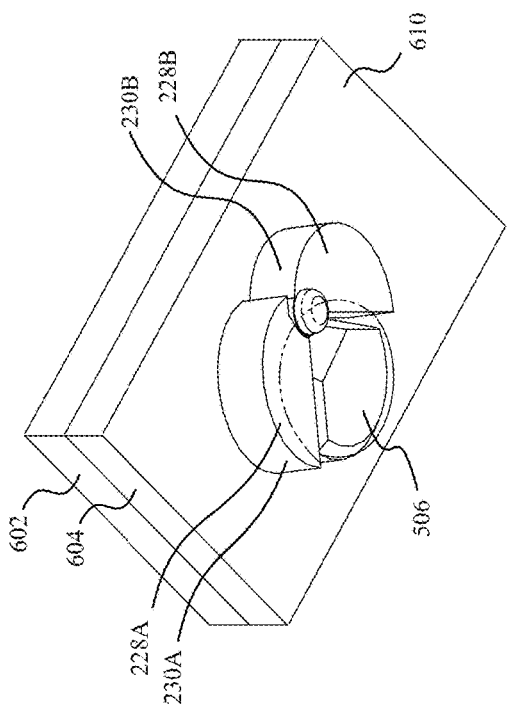
FIG. 10D illustrates a top perspective view of an anchor drive mechanism of the second embodiment coupled with an anchor inserted into a hole of work pieces.

The anchor drive mechanism 104/104A is then coupled to the anchor 102. For this, the shaft body 502/502A is placed, from the proximal end 208A/208B side i.e. from the threaded sections 220A/220B end of the anchor 102 which is accessible from frontal side, inside the opening 240 created by the anchor 102 in the open configuration as shown in FIGS. 9A, 9B and 10A (for the purpose of clarity, in FIGS. 9 and 10A the anchor drive mechanism 104 is shown without the head 404). In this condition, as in FIGS. 9A, 9B and 10A, the forward sides 520A and 520B of the shaft body 502/502A face the planar faces 306A and 306B of the anchor elements 202A and 202B respectively. This arrangement makes sure that no relative rotational movement can occur between the anchor 102 and the shaft body 502/502A of the anchor drive mechanism 104/104A. Also, at this position, as shown in FIG. 12A, the head 404 of the anchor drive mechanism 104 remains over the threaded sections 220A and 220B of the anchor 102 and the internal threads 424 of the head 404 engage the substantially continuous external thread 236. The same happens when embodiment 104A is used. Rotation of the head 404/404A (clockwise rotation for right-handed threads, for example) causes the anchor 102 to retract i.e. translate toward the proximal direction.

Even though, the head 404/404A can rotate freely with respect to the shaft body 502/502A and the anchor 102, the shaft body 502/502A and the anchor 102 may tend to rotate along with the head 404/404A due to friction. In such a situation, an external force may be required to stop the shaft body 502/502A from rotating. For example, as shown in FIGS. 11A, 11B (for embodiment 104) and 11C (for embodiment 104A), a common screwdriver 1102 can be engaged with the tool grip member 514 (indicated in FIGS. 5B, 5G and 5J), which remains accessible from the top head end side at all the time, to apply the external force required to prevent the shaft body 502/502A from rotating. The shaft body 502/502A in turn inhibits rotational movement of the anchor 102 so that the anchor can only have translational movement in the proximal or distal direction when the head 404/404A is rotated.

When the head 404/404A is rotated further, with the help of a tool with a shaped opening or jaws for gripping and turning a nut or bolt such as a common spanner 1104 as shown in FIGS. 11A-11C, if required, the anchor 102 moves further in the proximal direction 1202 bringing the retainer sections 228A and 228B closer to the rear face 610 of the hole 606 as shown in FIG. 12B. With further rotation of the head 404/404A, at least a part of the retainer sections 228A and 228B will abut the rear face 610 of the hole 606 and further translational movement of the anchor 102 relative to the anchor drive mechanism 104/104A will be restricted/inhibited. At this point, as shown in FIGS. 12C and 12D, there is the head 404/404A sitting on the frontal face 608 of the hole 606 on one side of the work pieces 602 and 604 and the retainer sections 228A and 228B abutting the rear face 610 of the hole 606 on the opposite side. This results in the removable blind fastener 100 fastening or holding the work pieces 602 and 604 together even though the work pieces were accessed from the frontal side 608 only.

For removal of the blind fastener 100, the above-mentioned steps can be followed in reverse order and, to do so, access from only one side i.e. from the side where the head 404/404A is positioned is required. As the head 404/404A is unscrewed or rotated in reverse way (anticlockwise for right-handed thread), the anchor 102 (and the shaft 502/502A in some embodiments) will move distally until/unless the threaded sections are in contact with the frontal face of the work piece, in which case the head 404/404A (and shaft 502) will move in the proximal direction, releasing the grip on the work pieces. Once the head 404/404A gets disengaged from the threaded sections 220A and 220B, the shaft drive mechanism 104/104A is withdrawn from the opening of the anchor 102. The anchor elements 202A and 202B can be then collapsed to bring to a closed configuration to finally withdraw the anchor 102 from the hole.

As is evident from the above description, the removable blind fastener 100 offers numerous advantages over the existing blind fasteners. It is fairly easy to install without requiring any special tool. In fact, for light duty uses, it can be installed by just using bare hands without needing any tools at all. It is removable and reusable and no deformation of parts occurs during installation or removal. By virtue of its design the removable blind fastener 100 offers better axial and shear load bearing capabilities than many blind fasteners, especially rivets. The removable blind fastener of the present invention can be made of one material (metal or plastic, for example), or of a combination of natural and/or man-made materials (neoprene, for example) depending on the intended use. The optional washer section 408 (integral part of the head 404/40A or additionally added beneath the head 404/404A) can be made of metals or non-metals (elastomers such as neoprene, nitrile, EPDM and natural rubber, for example). Also, the head 404/404A can be made as a lock nut/locking nut/self-locking nut/prevailing torque nut or elastic stop nut that resists loosening under vibrations and torque. Its locking action could be created by the distortion of the uppermost internal threads 424 and should resist loosening caused by shock, vibration and other forces. The locking action can also be created either by making the washer section 408 act like a lock washer (split washer type, spring washer type or wedge washer type, for example) and/or by using additional lock washer(s), both of which apply a constant force against the head to prevent unintentional loosening of the head.

What is claimed is:

1. A removable blind fastener comprising:
    an anchor comprising:
        a first anchor member and a second anchor member each having a main body extending from a proximal end to a distal end along a longitudinal axis, and from a first lateral edge to a second lateral edge along a transverse axis, said main body comprising:
            a threaded section disposed on said proximal end, said threaded section having a threaded outer surface;
            an elongated body interposed between said proximal end and said distal end, said elongated body having an elongated body outer face; and
            a retainer section disposed on said distal end, said retainer section having a retainer outer face extending beyond said elongated body outer face; and a coupling element rotatably coupling said first anchor member to said second anchor member along said first lateral edges, wherein said anchor is configured to be transitioned from a closed configuration having said first anchor member and said second anchor member in an abutting relationship to an open configuration having said first anchor member and said second anchor member in a facing relationship defining an opening therebetween extending through said proximal end to said distal end; and an anchor drive mechanism comprising:
a shaft dimensioned to be irrotatably and translationally received in said opening, said shaft having a top portion comprising a threaded section;
wherein a head having an internal thread is adapted to engage with a substantially continuous external thread formed by said threaded outer surfaces of said anchor in said open configuration along with said threaded section of said anchor drive mechanism such that, when said shaft is irrotatably and translationally received in said opening, a rotation of said head causes a retraction of said anchor.

2. The removable blind fastener of claim 1, wherein said head further comprises a head interior surface, a head exterior surface, a top head end and a bottom head end, said head interior surface defining a bore extending from said top head end to said bottom head end having said internal thread disposed over at least a portion of said bore.

3. The removable blind fastener of claim 1, wherein said head is rotatably coupled to said top portion.

4. The removable blind fastener of claim 1, wherein said first lateral edges of said first anchor member and said second anchor member at least partially overlap each other in said open configuration.

5. The removable blind fastener of claim 1, wherein said head exterior surface is sized and dimensioned to be gripped by a tool or by hand of an individual.

6. The removable blind fastener of claim 1, wherein said top portion of said shaft comprises a top valley having a tool grip member disposed thereon.

7. The removable blind fastener of claim 6, where said top portion further comprises a top valley edge and a generally frustoconical lip extending at least partially around said top valley.

8. The removable blind fastener of claim 7, wherein said top head end engages with said generally frustoconical lip and with said top valley edge to inhibit translational movement of said shaft relative to said head while allowing said rotation of said head.

9. The removable blind fastener of claim 1, wherein said retraction of said anchor is arrested when at least a part of said retainer sections abuts a rear face of a hole disposed in one or more work pieces, said anchor being inserted through a frontal face of said hole in said closed configuration with said retainer sections positioned behind said rear face of said hole and said head being positioned on said frontal face of said hole.

10. A removable blind fastener comprising:
a plurality of anchor members, each of said plurality of anchor members having a main body, wherein a threaded outer surface is disposed on a proximal end of said main body and a retainer section having a retainer outer face extending beyond an elongated body outer face of said main body is disposed on a distal end of said main body;
a coupling element rotatably coupling each of said plurality of anchor members to at least one other anchor member of said plurality of anchor members, wherein said plurality of anchor members are configured to be transitioned from a closed configuration having said plurality of anchor members in an abutting relationship to an open configuration having said plurality of anchor members in a facing relationship defining an opening thereamong extending through said proximal end to said distal end; and
an anchor drive mechanism having a shaft dimensioned to be irrotatably and translationally received in said opening, said shaft having a top portion comprising a threaded section;
wherein a head having an internal thread is adapted to engage with a substantially continuous external thread formed by said threaded outer surfaces of said anchor in said open configuration along with said threaded section of said anchor drive mechanism such that, when said shaft is irrotatably and translationally received in said opening, a rotation of said head causes a retraction of said anchor.

11. The removable blind fastener of claim 10, wherein said head further comprises a head interior surface, a head exterior surface, a top head end and a bottom head end, said head interior surface defining a bore extending from said top head end to said bottom head end having said internal thread disposed over at least a portion of said bore.

12. The removable blind fastener of claim 10, wherein said top portion of said shaft comprises a top valley having a tool grip member disposed thereon.

13. The removable blind fastener of claim 12, wherein said top portion further comprises a top valley edge and a generally frustoconical lip extending at least partially around said top valley.

14. The removable blind fastener of claim 13, wherein said top head end engages with said generally frustoconical lip and with said top valley edge to inhibit translational movement of said shaft relative to said head while allowing said rotation of said head.

15. The removable blind fastener of claim 10, wherein said retraction of said anchor is arrested when at least a part of said retainer sections abuts a rear face of a hole disposed in one or more work pieces, said anchor being inserted through a frontal face of said hole in said closed configuration with said retainer sections positioned behind said rear face of said hole and said head being positioned on said frontal face of said hole.

16. A method for installation of a removable blind fastener in one or more work pieces having a hole, said method comprising:
providing, an anchor comprising a plurality of anchor members, each of said plurality of anchor members having a proximal end with a threaded outer surface, a distal end with a retainer section and an elongated body interposed between said proximal end and said distal end, said retainer section having a retainer outer face extending beyond an elongated body outer face of said elongated body, each of said plurality of anchor members being rotatably coupled to at least one other anchor member of said plurality of anchor members;
setting, said anchor in a closed configuration, said retainer sections of said anchor are being sized and dimensioned to pass through said hole in said closed configuration;
inserting, said anchor in said closed configuration through a frontal face of said hole such that said retainer sections are positioned behind a rear face of said hole;

setting, said anchor in an open configuration, wherein, in said open configuration, said plurality of anchor members are positioned in a facing relationship defining an opening therebetween extending through said proximal end to said distal end, said retainer outer faces of said retainer sections extending beyond a diameter of said hole in said open configuration;

providing, an anchor drive mechanism comprising a shaft having a top portion with a threaded section, said shaft being dimensioned to be irrotatably and translationally received in said opening;

inserting, said shaft in said opening from said proximal end of said anchor;

engaging, an internal thread of a head with a substantially continuous external thread formed by said threaded outer surface of said-plurality of anchor members in said open configuration along with said threaded section of said anchor drive mechanism such that a rotation of said head causes a retraction of said anchor till at least a part of said retainer sections abuts said rear face of said hole and inhibits further translational movement of said anchor relative to said head.

17. The method of claim 16, wherein said top portion of said shaft comprises a top valley having a tool grip member disposed thereon.

18. The method of claim 17, wherein said head further comprises a head interior surface, a head exterior surface, a top head end and a bottom head end, said head interior surface defining a bore extending from said top head end to said bottom head end having said internal thread disposed over at least a portion of said bore.

\* \* \* \* \*